(12) United States Patent
Calvarese et al.

(10) Patent No.: US 9,791,546 B2
(45) Date of Patent: Oct. 17, 2017

(54) ULTRASONIC LOCATIONING SYSTEM USING A DUAL PHASE PULSE

(71) Applicant: SYMBOL TECHNOLOGIES, INC., Schaumburg, IL (US)

(72) Inventors: Russell E Calvarese, Stony Brook, NY (US); Richard J Lavery, Huntington, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 477 days.

(21) Appl. No.: 14/448,161

(22) Filed: Jul. 31, 2014

(65) Prior Publication Data
US 2016/0033619 A1    Feb. 4, 2016

(51) Int. Cl.
| | | |
|---|---|---|
| G01S 5/26 | (2006.01) | |
| G01S 1/74 | (2006.01) | |
| G01S 1/80 | (2006.01) | |
| G01S 11/16 | (2006.01) | |

(52) U.S. Cl.
CPC ......... *G01S 5/26* (2013.01); *G01S 1/74* (2013.01); *G01S 1/805* (2013.01); *G01S 11/16* (2013.01)

(58) Field of Classification Search
CPC ...... G01S 7/52026; G01S 15/102; G01S 3/80; G01S 15/00; G01S 15/10; G01S 7/52
USPC .......................................................... 367/125
See application file for complete search history.

(56) References Cited

U.S. PATENT DOCUMENTS

| | | | |
|---|---|---|---|
| 3,852,751 A | 12/1974 | Wood et al. | |
| 4,187,491 A | 2/1980 | Chase et al. | |
| 4,954,999 A | 9/1990 | Teel et al. | |
| 5,107,467 A * | 4/1992 | Jorgensen | A61F 9/08 367/116 |
| 7,283,011 B2 | 10/2007 | Cohen et al. | |
| 8,264,264 B2 | 9/2012 | Zebedee | |
| 2003/0035342 A1* | 2/2003 | Harrington | G01S 7/52026 367/127 |
| 2011/0279305 A1 | 11/2011 | Lellouch et al. | |
| 2013/0329525 A1* | 12/2013 | Lavery | G01S 5/22 367/127 |

FOREIGN PATENT DOCUMENTS

| | | |
|---|---|---|
| WO | 0118559 A1 | 3/2001 |
| WO | 20120137017 | 10/2012 |

OTHER PUBLICATIONS

International Search Report and Written Opinion dated Oct. 13, 2015 in counterpart PCT application PCT/US2015/040694.

* cited by examiner

*Primary Examiner* — Luke D Ratcliffe
(74) *Attorney, Agent, or Firm* — Yuri Astvatsaturov

(57) ABSTRACT

An ultrasonic locationing system using a dual phase pulse includes an emitter emitting two consecutive frequency bursts, each having a different phase, within one ultrasonic pulse. A receiver microphone receives the ultrasonic pulse, and a processor runs an amplitude-based detection algorithm on the pulse for a band of frequencies of interest and detects a first burst of the pulse within the proper frequency band and having an amplitude exceeding a threshold. Whereupon, the processor determines a relative phase difference between the first burst and a second burst of the pulse and determines whether the relative phase difference is within a predetermined acceptance window, indicating that the pulse is valid for use in locationing the emitter and associated mobile device.

7 Claims, 3 Drawing Sheets

ULTRASONIC LOCATIONING SYSTEM USING A DUAL PHASE PULSE

BACKGROUND

An ultrasonic emitter can be used to determine the location of items that contain ultrasonic receivers, such as a mobile communication device present within a retail, factory, or warehouse environment, for example. The ultrasonic emitter can transmit ultrasonic energy in a short burst which can be received by an ultrasonic transducer (microphone) in the ultrasonic receiver, thereby establishing the presence of the device within the environment.

Further, the use of several ultrasonic emitters distributed within the environment can also be used to provide a specific location of a particular device using techniques known in the art such as triangulation, trilateration, and the like. However, unlike radio frequency locationing systems, ultrasonic locationing systems suffer from particular problems related to the characteristics of ultrasonic sound waves and their environment of use. For example, ultrasonic signals are easily subject to noise. In particular, broadband noise events (which are typical of impact noise) can fall within the frequency band of interest, and cannot be filtered out without also filtering the desired signal. As a result, accurately triggering a location measurement using an incoming pulse in a flight time based locationing system can be difficult for amplitude based detectors if there are a lot of in-band noise events that could result in false triggers. A pulse design is needed such that additional metrics can be used in order to accurately identify it as a valid pulse.

Ultrasonic ranging pulses typically have very short durations to prevent reflections from arriving at the receiver before the direct signal is completely received. However, a very short burst of an ultrasonic signal implies little information can be added to the burst. Further, increasing the "signature" of a pulse is difficult when pulses are required to be short in duration which is the case for typical locationing systems. In addition, detectors of single pulses are very susceptible to impact noise or noise tones greater in length than the pulse period. Moreover, the selectivity of a very short Fast Fourier Transform (FFT) or a Goertzel algorithm run on a single pulse can be poor, i.e. the system is susceptible to tones at nearby frequencies.

Accordingly, there is a need for an improved technique to resolve the above issues with an ultrasonic locationing system. Furthermore, other desirable features and characteristics of the present invention will become apparent from the subsequent detailed description and the appended claims, taken in conjunction with the accompanying drawings and the foregoing background.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
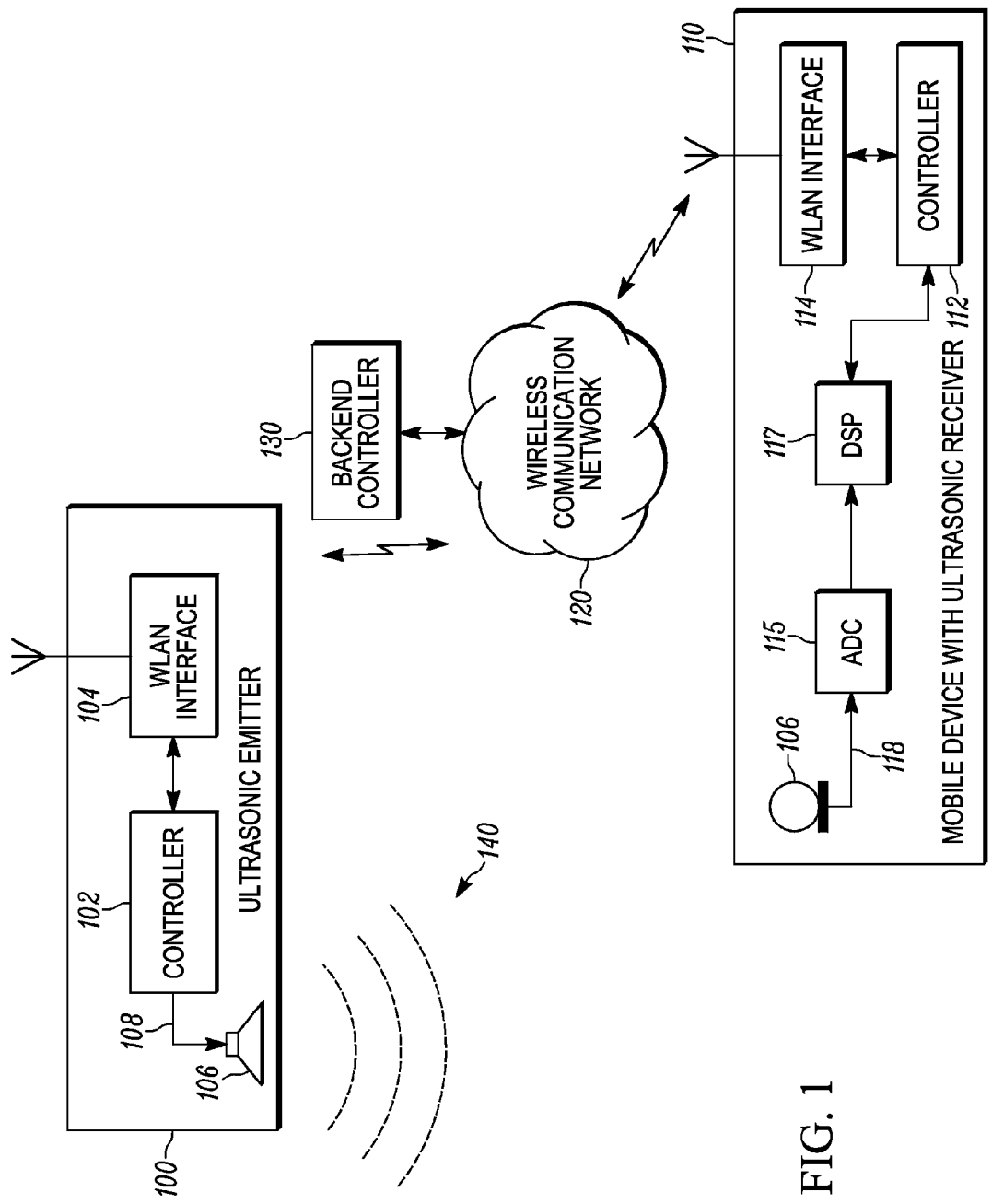
FIG. 1 is a simplified block diagram of an ultrasonic locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, an improved technique is described to resolve the issues with ultrasonic locationing of a device with an ultrasonic receiver within an environment. The present invention resolves this difficulty by using dual phases within one emitter pulse, as will be described below. Further, although adding phase information contributes much to identifying a valid pulse signature, phase information is prone to Doppler effects if the device is moving. Therefore, the present invention also corrects for Doppler effects using vector information derived from the position history of the device.

The device to be locationed and incorporating the receiver can include a wide variety of business and consumer electronic platforms such as cellular radio telephones, mobile stations, mobile units, mobile nodes, user equipment, subscriber equipment, subscriber stations, mobile computers, access terminals, remote terminals, terminal equipment, cordless handsets, gaming devices, personal computers, and personal digital assistants, and the like, all referred to herein as a device. Each device comprises a processor that can be further coupled to a keypad, a speaker, a microphone, a display, signal processors, and other features, as are known in the art and therefore not shown.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor or controller. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic locationing system using a dual phase pulse, in accordance with the present invention. Although an ultrasonic system is demonstrated herein, it should be recognized that the present invention as also applicable to RF systems. In the embodiment shown, one or more ceiling mounted devices emit a pulse which is used by a mobile device receiver and/or backend controller to locate the mobile device. However, it should be recognized that the present invention works equally well for one or more receiver(s) mounted on the ceiling that receive pulses emitted by the mobile device so that the backend controller can locate the mobile device.

As shown, an ultrasonic transponder such as a piezoelectric speaker or emitter 106 can be implemented within a ceiling mounted device 100. The emitter can send a short pulse of ultrasonic sound (e.g. 140) within the environment. The pulse includes two consecutive but different phases of the same frequency burst. In other words, the ultrasonic pulse includes two consecutive frequency bursts, each having the same frequency but different phases. The device 100 can include a controller 102 to provide the two phase components 108 to be transmitted in an ultrasonic pulse 140 by the emitter(s) 106. The controller 102 can also be coupled to a wireless local area network interface 104 for wireless communication with other devices in the communication network 120 such as a backend controller 130 that can control the ultrasonic emitter 100 remotely.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

A mobile device with an ultrasonic receiver 110 includes a transducer such as an ultrasonic microphone 116 that can respond to the ultrasonic pulse 140 transmitted from the ultrasonic emitter 106. The microphone 116 provides electrical signals 118 to a receiver circuit including an analog-to-digital converter 115 that feeds a digital waveform to a digital signal processor 117 and a controller 112. The receiver controller 112 can also be coupled to a wireless local area network interface 114 for wireless communication with other devices in the communication network 120. Alternatively, the controller 112 could be connected to the communication network 120 through a wired interface connection (not shown), such as an Ethernet interface connection.

In order to provide locationing ability, using trilateration and/or time-of-arrival techniques for example, the receiver of the present invention can receive pulses from a plurality of emitters at known location within the environment and is able to discriminate between different arrival times of particular ultrasonic pulses. As the location and position of the emitters 106 is known and fixed, a signal received by these emitters can be used to locate and track the position of an receiver device 100 using: time difference of arrival (TDOA) at each microphone, trilateration, multilateration, or other suitable locationing technique, as are known in the art.

In the embodiment described herein, the emitter 100 emits the dual phase pulse at a frequency of 19-22 kHz in one ultrasonic burst, although it should be realized that other frequencies could be used. It may be that more than one ceiling mounted device within the environment carries an emitter. In this case, the same frequencies can be used by the emitters at different times, or a different frequency can be used for each emitter to better distinguish the emitters by the receiver 110. Choosing which frequency for each emitter to use can be accomplished by a backend controller 130 of the locationing system, which can communicate over the communication network 120 in order to direct different emitters 100 to emit the a different frequency in its ultrasonic signal pulse at specified times. Upon receiving the pulse, the receiver 110 can communicate with the backend controller over the communication network that it has received the pulse, and the backend controller will then know that the pulse came from a particular emitter.

The backend controller knows the emitting time when the pulse was sent by each emitter, and can then determine the flight time of the pulse by subtracting the emitting time from the acknowledgment of the reception time from the receiver, i.e. RF synchronization. Alternatively, the backend controller could also radio the time of the originating burst to the receiver which would allow the receiver to convert TDOA values into flight times allowing trilateration, which has accuracy advantages over multilateration is some cases. It should be noted that the radio frequency communications are relatively instantaneous next to the flight time of the ultrasonic signal and RF flight time could be ignored. Using a locationing technique such as multilateration, along with the TDOA information, the receiver 110 could determine and inform the backend controller of the location of the mobile device, which the backend controller can use to track a history of the mobile device's location during each subsequent pulse, establishing a motion vector for the device. In this example, it is assumed that a four millisecond ultrasonic pulse, having two sequential occurrences of a two millisecond frequency burst with two different phases, is emitted by the emitter.

Figure 2:
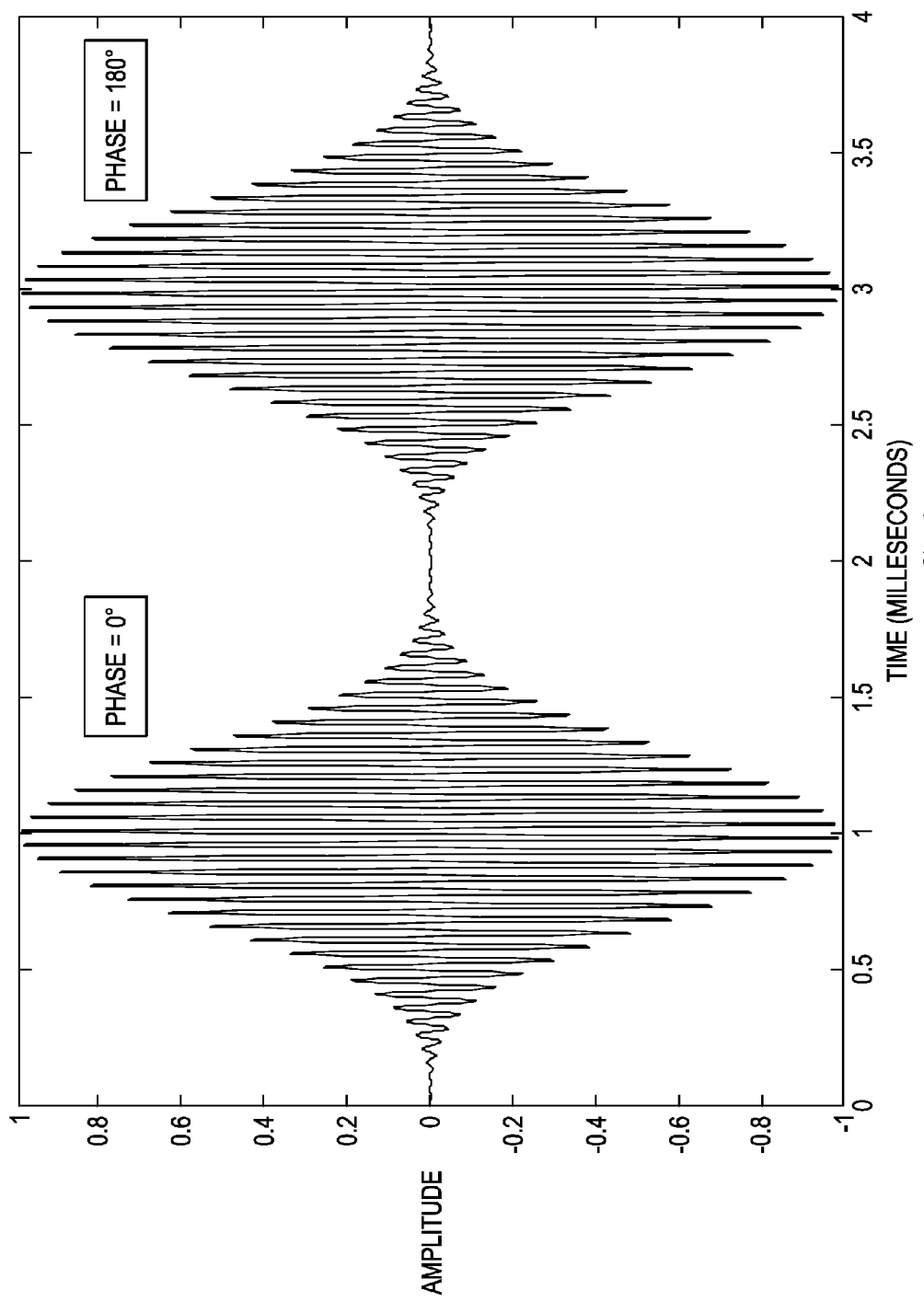
FIG. 2 is a graphical representation of a transmitted dual phase pulse in the time domain, in accordance with some embodiments of the present invention.

FIG. 2 shows a specific pulse configuration that allows the present invention to validate a pulse with both amplitude and phase information before triggering a location measurement. The pulse consists of a gated carrier tone which is band limited immediately before a second gated carrier tone which is identical to the first, with the only difference being a relative phase that is different from the preceding component. Preferably, the first tone and the second tone are approximately 180 degrees in phase away from each other, although it should be recognized that other relative phase shifts could be used. Two single frequency bursts, at different (opposite) phases at 20 kHz in a high Q system are shown of the emitted ultrasonic pulse in the time domain in this ideal representation of FIG. 2.

Therefore, the present invention introduces two consecutively emitted frequency bursts at two different phases in one ultrasonic pulse for locationing measurements. The present invention allows the ultrasonic locationing system to more consistently produce accurate TDOA measurements with the addition of a second phase in the ultrasonic pulse emitted from the emitter without any loss in system Q factor or signal-to-noise ratio. The key piece of information that makes this possible is the difference in phase between the two frequency bursts within the pulse. Unless the received pulse has both frequency bursts with the proper phase relationship and proper amplitude, then the pulse is declared invalid and will not be used in locationing measurements. Only a received pulse having both frequency bursts with the proper phase relationship above an amplitude trigger threshold will be valid for use in locationing measurements.

Of course, it should be recognized that the receiving device can be mobile, where a Doppler shift in the received pulse can change the phase relationship between the two bursts in the pulse. Therefore, the present invention can allow for the Doppler shift using the motion vector information derived from the position history. The present invention allows for a reasonable Doppler shift by defining an acceptance window that allows for an acceptable range of phase differences between the two bursts, wherein a measured phase difference between the two bursts that falls within the acceptance window indicate a valid pulse for use in locationing.

In operation, two different phases of a frequency burst are transmitted consecutively in one ultrasonic pulse by an emitter of a ceiling mounted device. The receiver will receive the ultrasonic pulse, where an analog-to-digital converter will convert the pulse into a digital waveform, which is fed to a digital signal processor that functions as a pulse detector. The pulse detector will first run an amplitude based detection algorithm for a band of frequencies of interest, e.g. 19-22 kHz. This detection algorithm could be a Goertzel algorithm, a short FFT, sliding DFT, envelope detection, or any other technique for pulse detection.

Once a burst is detected within the proper frequency band and having an amplitude exceeding a threshold, the pulse detector will then take the data of that first burst as well as the data of the second burst that immediately follows and implement a phase detection technique to determine an absolute phase measurement on the first burst that caused the first pulse to trip the amplitude threshold. Using the same reference point, the pulse detector will then determine the absolute phase of the second burst immediately following the first burst. The phase detection technique can be implemented with a Goertzel algorithm set to report phase information, an FFT, or any other technique for phase measurement.

With both absolute phase measurements obtained, the receiver can then measure the relative phase difference between both bursts. If the phase difference is calculated to be X degrees within some tolerance Y, there is a high likelihood that it received a valid pulse. If the phase difference is calculated to be some other random amount, then there is a high likelihood that the receiver received a broadband noise pulse and should discard the event.

A position history of previously stored device locations is used to determine the motion vector of the mobile device, and the component of vector motion towards or away from the emitter is then used to calculate the Doppler frequency and in turn the expected phase shift, Z, given the time period between the emitted pulses. Values for Z can be as high as 60 degrees which is too great not to consider (normal walking speed, towards transmitter, 20 kHz, 2 mS between pulses). The present invention allows for a reasonable Doppler shift given the motion vector by defining an acceptance window that allows for an acceptable range of phase differences between the two bursts, wherein a measured phase difference between the two bursts that falls within the acceptance window indicate a valid pulse for use in locationing. Specifically, the acceptance window is defined as X+Z±Y, where X is the chosen phase difference between the two frequency pulses of the ultrasonic burst (e.g. 180 degrees), Z is the expected phase shift due to the motion vector of the mobile device, and Y is a predetermined tolerance for phase measurements.

Figure 3:
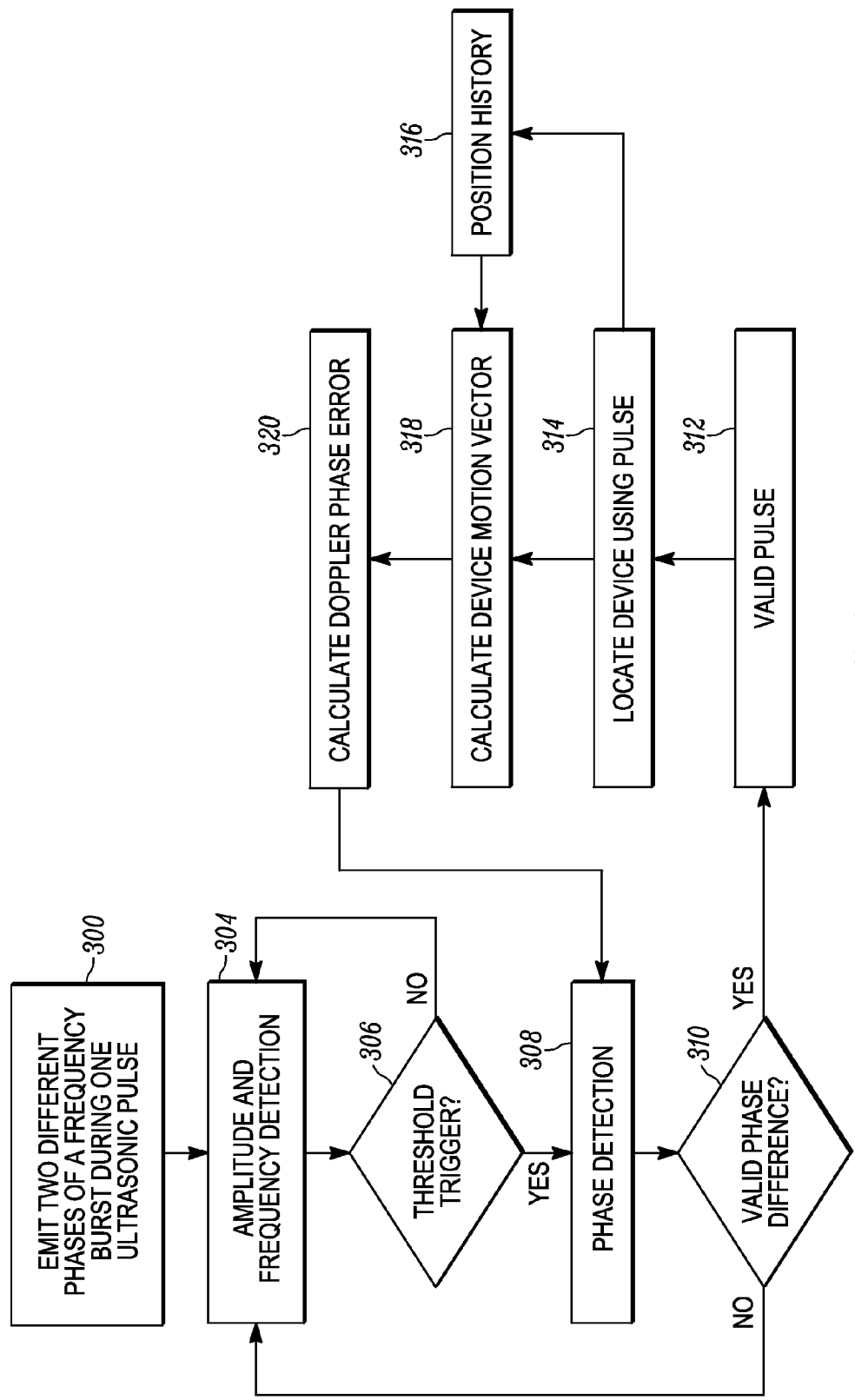
FIG. 3 is a flow diagram illustrating a method for ultrasonic locationing, in accordance with some embodiments of the present invention.

FIG. 3 is a diagram illustrating a method of ultrasonic locationing using a dual phase pulse, according to some embodiments of the present invention.

A first step 300 includes emitting two different phases of a frequency burst consecutively in one ultrasonic pulse from a ceiling mounted emitter. In other words, the ultrasonic pulse includes two consecutive frequency bursts, each having the same frequency but different phases.

A next step 304 includes running an amplitude-based detection algorithm on the pulse for a band of frequencies of interest, e.g. 19-22 kHz. If a proper pulse is not detected 306, the method keeps monitoring for a proper pulse 304.

Once a burst is detected 306 within the proper frequency band and having an amplitude exceeding a threshold, a next step 308 is taking the data of that first burst as well as the data of the second burst that immediately follows and implement a phase detection technique to determine an absolute phase measurement on the first burst that caused the first pulse to trip the amplitude threshold of step 306. Using the same reference point, the pulse detector will then determine the absolute phase of the second burst immediately following the first burst.

With both absolute phase measurements obtained, a next step 310 is measuring the relative phase difference between both bursts to determine if the pulse is valid. If the phase difference is calculated to be x degrees within some tolerance Y, there is a high likelihood that it received a valid pulse 312 that can be used for locating the (receiver of the) mobile device 314. If the phase difference is calculated to be some other random amount, then there is a high likelihood that it received a broadband noise pulse and should discard the event and return to monitoring for a proper pulse 304.

A position history 316 of previously stored locations 314 of the mobile device is established to calculate the motion vector 318 of the mobile device, and the component of vector motion towards or away from the emitter is then used to calculate the Doppler frequency and in turn the expected phase shift, Z, 320, given the frequency and time period between the emitted pulses. Values for Z can be as high as 60 degrees which is too great not to consider (normal walking speed, towards transmitter, 20 kHz, 2 milliseconds between pulses). The present invention allows for a reasonable Doppler shift given the motion vector by defining an acceptance window that allows for an acceptable range of phase differences between the two bursts, wherein a measured phase difference between the two bursts that falls within the acceptance window indicate a valid pulse 312 for use in locationing 314 the receiver (and correspondingly the mobile device containing the receiver). Specifically, the acceptance window can be defined as X+Z±Y, where X is the chosen phase difference between the two frequency pulses of the ultrasonic burst (e.g. 180 degrees), Z is the expected phase shift due to the motion vector of the mobile device, and Y is a predetermined tolerance for phase measurements.

Advantageously, the present invention provides an accurate technique to easily distinguish between a valid pulse and a noise pulse. Since broadband noise events tend to occur at random times, having the ability to discard noise events when they occur greatly improves locationing performance. This improvement comes from the fact that a locationing measurement will not be triggered on an invalid pulse that could cause a valid pulse to be missed, which could be arriving soon after the noise event. In addition, the effectiveness of the phase discrimination is not reduced by Doppler effects.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An ultrasonic locationing system using a dual phase pulse, comprising:
   an emitter operable to emit two consecutive frequency bursts, each having a different phase, within one ultrasonic pulse;
   a receiver with at least one microphone operable to receive the ultrasonic pulse;
   a processor operable to run an amplitude-based detection algorithm on the pulse for a band of frequencies of interest, and detect a first burst of the pulse within the proper frequency band and having an amplitude exceeding a threshold, whereupon the processor is further operable to determine a relative phase difference between the first burst and a second burst of the pulse, wherein a relative phase difference within a predetermined acceptance window indicates that the pulse is valid for use in locationing the receiver; and
   a position history where previously stored receiver locations are stored by the processor,
   wherein the processor is further operable to calculate a motion vector of the receiver from the position history, calculate a Doppler frequency and in turn the expected phase shift due to the motion vector, given the frequency of the frequency burst, and adjust the acceptance window by the expected phase shift, Z.

2. The system of claim 1, wherein the two different phases are approximately 180 degrees apart.

3. The system of claim 1, wherein the band of frequencies of interest is ultrasonic frequencies in the range of 19-22 kHz.

4. The system of claim 1, wherein the two different phases emitted in the pulse are chosen to be X degrees apart, and wherein the acceptance window is X+Z±Y, where Y is a predetermined tolerance for phase measurements.

5. A method of ultrasonic locationing using a dual phase pulse, comprising:
   emitting two consecutive frequency bursts each having a different phase within one ultrasonic pulse;
   running an amplitude-based detection algorithm on the received pulse for a band of frequencies of interest;
   detecting a first burst of the pulse within the proper frequency band and having an amplitude exceeding a threshold; whereupon
      detecting a relative phase difference between the first burst and a second burst of the pulse;
      determining whether the relative phase difference is within a predetermined acceptance window, indicating that the pulse is valid for use in locationing; and
      locationing of a mobile device using the valid pulse
   establishing a position history of the mobile device using previously stored device locations;
   calculating a motion vector of the mobile device from the position history;
   calculating a Doppler frequency and in turn the expected phase shift due to the motion vector, given the frequency of the frequency burst; and
   adjusting the acceptance window by the expected phase shift, Z.

6. The method of claim 5, wherein the two different phases emitted in the pulse are chosen to be X degrees apart, and wherein the acceptance window is X+Z±Y, where Y is a predetermined tolerance for phase measurements.

7. The method of claim 6, wherein X is approximately 180 degrees.

* * * * *